(12) United States Patent
Ng et al.

(10) Patent No.: US 12,210,259 B2
(45) Date of Patent: Jan. 28, 2025

(54) MULTI-VIEW DISPLAY WITH REDUCED BEZELS COMPRISING AN IMAGE EXPANSION LAYER

(71) Applicant: Misapplied Sciences, Inc., Pasadena, CA (US)

(72) Inventors: Albert Han Ng, Pasadena, CA (US); David Randall Bonds, Chatsworth, GA (US); Hitesh Ahuja, Westlake Village, CA (US); David Steven Thompson, Irvine, CA (US)

(73) Assignee: Misapplied Sciences, Inc., Pasadena, CA (US)

( * ) Notice: Subject to any disclaimer, the term of this patent is extended or adjusted under 35 U.S.C. 154(b) by 10 days.

(21) Appl. No.: 18/487,758

(22) Filed: Oct. 16, 2023

(65) Prior Publication Data

US 2024/0126128 A1 Apr. 18, 2024

Related U.S. Application Data

(60) Provisional application No. 63/416,851, filed on Oct. 17, 2022.

(51) Int. Cl.
*G02F 1/137* (2006.01)
*G02F 1/1335* (2006.01)
*G02F 1/13357* (2006.01)

(52) U.S. Cl.
CPC ........ *G02F 1/137* (2013.01); *G02F 1/133504* (2013.01); *G02F 1/133524* (2013.01); *G02F 1/133526* (2013.01); *G02F 1/1336* (2013.01)

(58) Field of Classification Search
None
See application file for complete search history.

(56) References Cited

U.S. PATENT DOCUMENTS

| | | |
|---|---|---|
| 10,269,279 B2 | 4/2019 | Ng et al. |
| 10,353,535 B2 | 7/2019 | Ng et al. |
| 10,404,974 B2 | 9/2019 | Dietz et al. |
| 10,427,045 B2 | 10/2019 | Thompson et al. |
| 10,565,616 B2 | 2/2020 | Thompson et al. |
| 10,613,699 B2 | 4/2020 | Thompson et al. |
| 10,778,962 B2 | 9/2020 | Ng et al. |
| 11,315,526 B2 | 4/2022 | Ng et al. |

(Continued)

FOREIGN PATENT DOCUMENTS

| | | | | |
|---|---|---|---|---|
| CN | 111915989 A | * | 11/2020 | ............ G02B 1/14 |
| WO | WO-2009066436 A1 | * | 5/2009 | ......... G02B 27/1066 |

*Primary Examiner* — Paul C Lee
(74) *Attorney, Agent, or Firm* — Seed IP Law Group LLP (57) ABSTRACT

A multi-view (MV) display with reduced bezels is provided. An MV display device includes: i) a flat panel display (FPD) with a front emission surface and including: an interior image area comprising a plurality of FPD pixels, each comprising a plurality of sub-pixels; and a perimeter non-image area; ii) an image expansion layer comprising a first surface and a second surface, wherein the first surface is coupled to the front emission surface of the FPD; a profile of the second surface is equal to or extends beyond a profile of the perimeter non-image area of the FPD; and the plurality of FPD pixels of the front emission surface of the FPD are imaged from the first surface to the second surface of the image expansion layer; and iii) a front optic layer coupled to the second surface of the image expansion layer.

20 Claims, 10 Drawing Sheets

(56) References Cited

U.S. PATENT DOCUMENTS

| | | |
|---|---|---|
| 11,474,770 B2 | 10/2022 | Ng et al. |
| 11,483,542 B2 | 10/2022 | Ng et al. |
| 11,553,172 B2 | 1/2023 | Ng et al. |
| 11,698,549 B2 | 7/2023 | Ng et al. |
| 2009/0085831 A1* | 4/2009 | Odoi ................. G02F 1/133524 345/1.3 |
| 2017/0082267 A1* | 3/2017 | Gagne .................... F21V 11/16 |
| 2018/0277032 A1* | 9/2018 | Ng ........................... G09G 5/10 |
| 2019/0162960 A1* | 5/2019 | Harada .............. G02B 27/0101 |

* cited by examiner

MULTI-VIEW DISPLAY WITH REDUCED BEZELS COMPRISING AN IMAGE EXPANSION LAYER

BACKGROUND

Technical Field

The present disclosure relates to multi-view (MV) display devices, and more particularly, to MV displays with reduced bezels.

Description of the Related Art

Figure 1A:
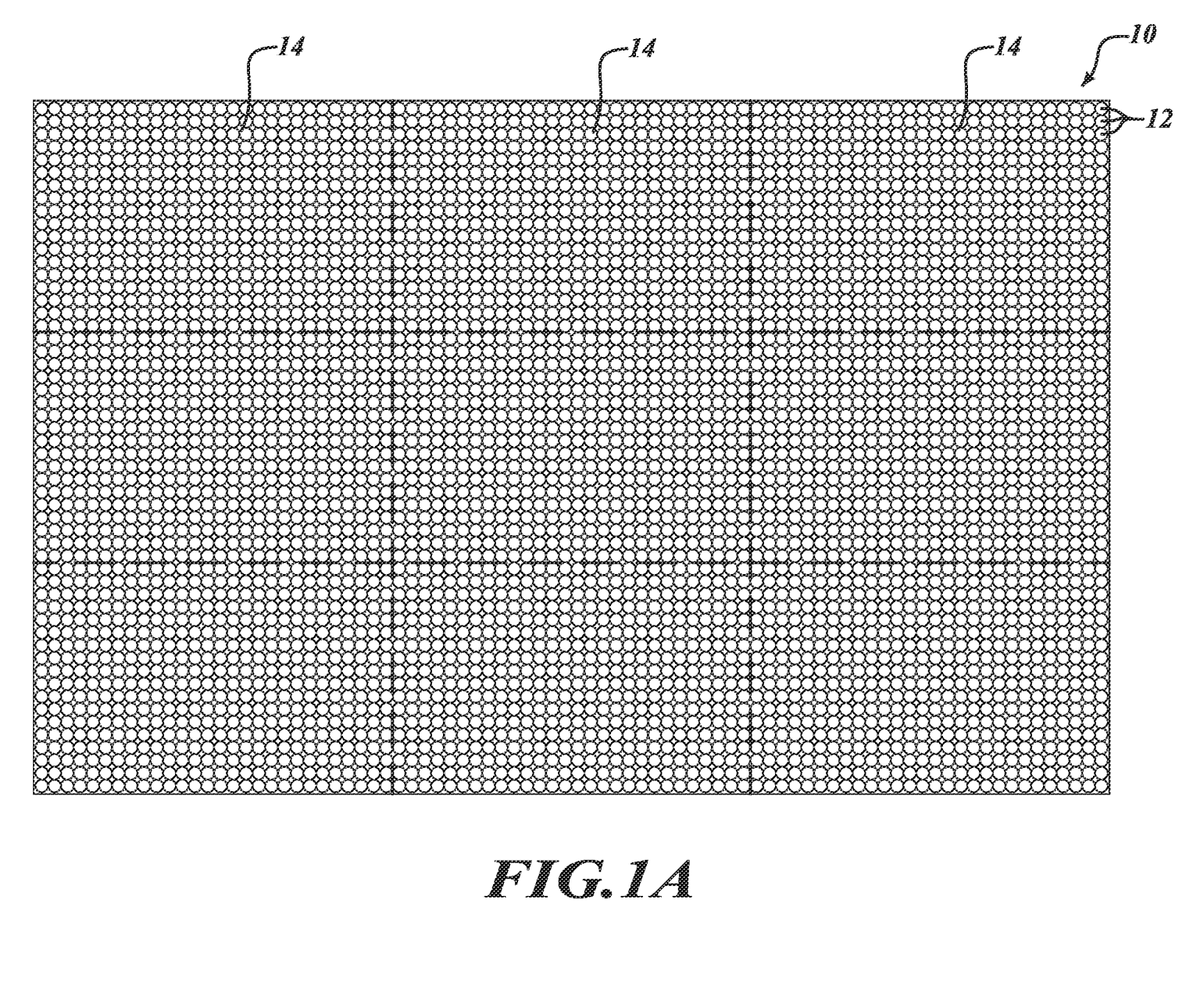
FIG. 1A illustrates a sample tiled display without bezels.

Referring to FIG. 1A, a multi-view (MV) display 10 comprises MV pixels 12, each of which can emit different colored light in different directions. These individually controllable units of light, or beamlets, allow multiple viewers to simultaneously perceive different messages or content on the same shared display. MV displays can receive specifications of viewing zones and content streams, and they can control the beamlets of the MV pixels to send the specified content streams to their corresponding viewing zones, such that different viewers at the different viewing zones observing the same shared display will receive different specified content streams. Certain technical details, applications and advantages of MV displays are disclosed in U.S. Pat. Nos. 10,269,279; 10,353,535; 10,404,974; 10,427,045; 10,565,616; 10,613,699; 10,778,962; 11,315,526; 11,474,770; 11,483,542; 11,553,172; and 11,698,549, which are incorporated by reference herein.

Still referring to FIG. 1A, the MV display 10 may comprise multiple individual tiles 14, each with a grid of MV pixels 12. These tiles 14 may be arranged adjacent to each other in horizontal and/or vertical dimensions, for example, to form a larger, higher-resolution display 10. This modularity provided by use of the tiles can have a range of benefits, including flexibility in configuration, improved manufacturing yield, simpler maintenance, and lower overall system cost.

Figure 1B:
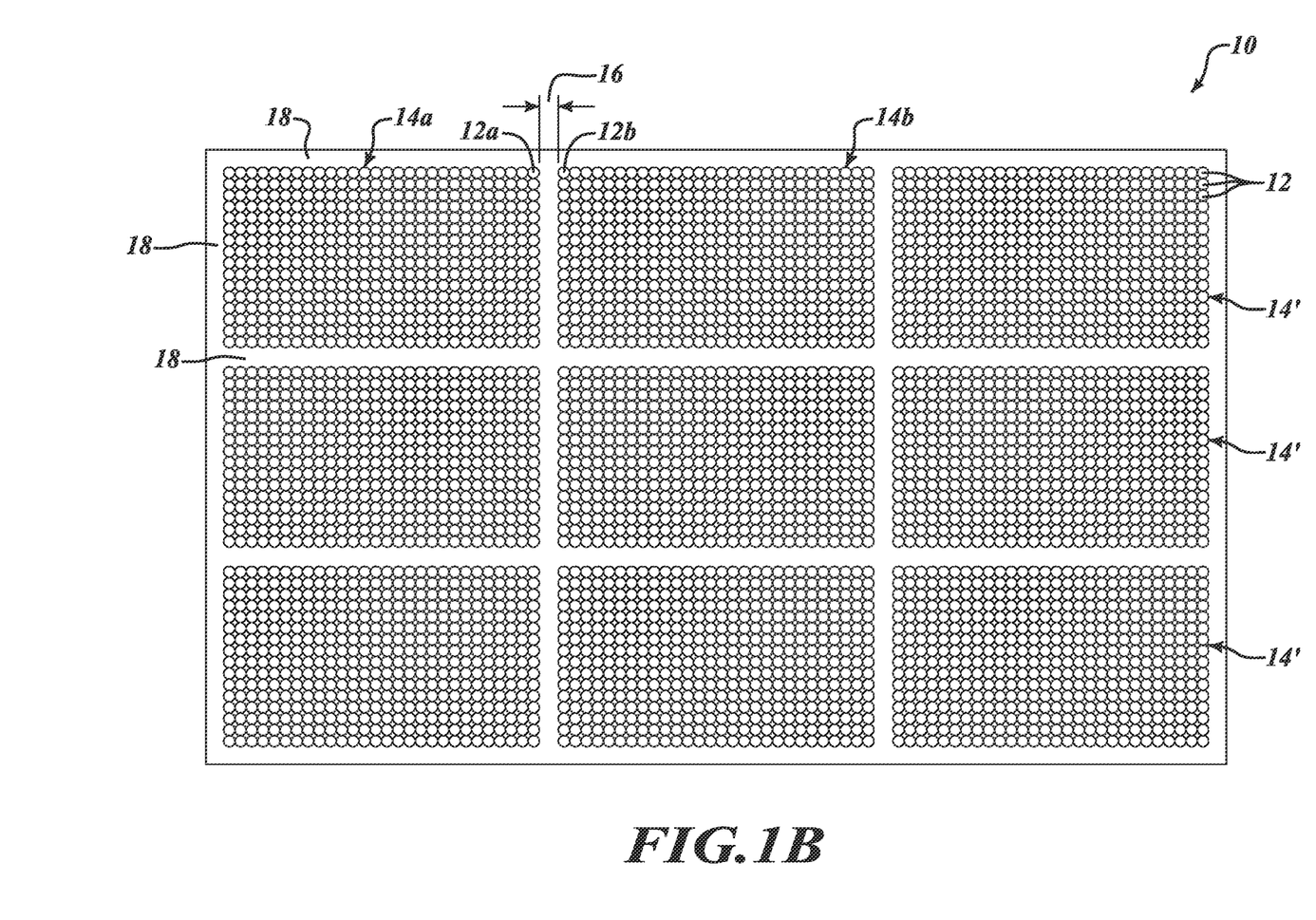
FIG. 1B illustrates a sample tiled display with bezels.

An image is typically more visually appealing when the overall grid of pixels 12 is uniform. FIG. 1A illustrates a sample tiled display 10 where each of the tiles 14 has no bezel such that the tiles 14 are arranged immediately adjacent to each other and the grid of pixels 12 is uniform. Referring to FIG. 1B, on the other hand, a bezel 18 is provided around the perimeter of the tile 14' as required by provision of mechanical, optical, and/or electrical components of the tile 14'. When arranging two MV display tiles 14' with bezels 18 adjacent to each other, a spacing 16 is formed by the bezels 18 between a perimeter MV pixel 12a of the first tile 14a and the adjacent perimeter MV pixel 12b of the second tile 14b, and the spacing 16 may be larger than the spacing between two internal MV pixels 12 within one tile 14'. As a result, when assembling these tiles 14', the bezels 18 create the spacing 16 which contributes to creating a visually disruptive "screen-door" effect. Therefore, techniques to reduce or eliminate bezel thickness of an MV display tile 14' are desirable.

BRIEF SUMMARY

According to exemplary embodiments, an MV display device (or MV display tile) comprises a flat panel display (FPD), an image expansion layer, and a front optic layer. The FPD may be, for example, an LCD having a front emission surface. The FPD includes an interior image area comprising a plurality of FPD pixels, each comprising a plurality of sub-pixels, and a perimeter non-image area which surrounds the interior image area. The perimeter non-image area constitutes a bezel of the FPD. The image expansion layer has two opposing surfaces—a first surface coupled to the front emission surface of the FPD, and a second surface. The profile of the second surface of the image expansion layer is equal to or larger than the profile of the perimeter non-image area (bezel) of the FPD, as viewed in a direction perpendicular to the second surface of the image expansion layer. In exemplary embodiments, the image expansion layer may be formed of a tapered fiber optic bundle, and the FPD pixels of the front emission surface of the FPD are imaged from the first surface to the second surface of the image expansion layer. The front optic layer may be formed of, for example, a grid of lenses, and is coupled to the second surface of the image expansion layer.

With such construction, the image of the interior image area of the FPD is coupled from the first (bottom) surface of the image expansion layer to the second (top) surface, where the size of the second (top) surface is equal to or larger than the overall profile of the FPD including the perimeter non-image area (bezel). Thus, the image formed on the second (top) surface runs or expands to the edge of the second (top) surface of the image expansion layer, such that the image appears bezel-less or with reduced bezels.

DETAILED DESCRIPTION

Figure 2A:
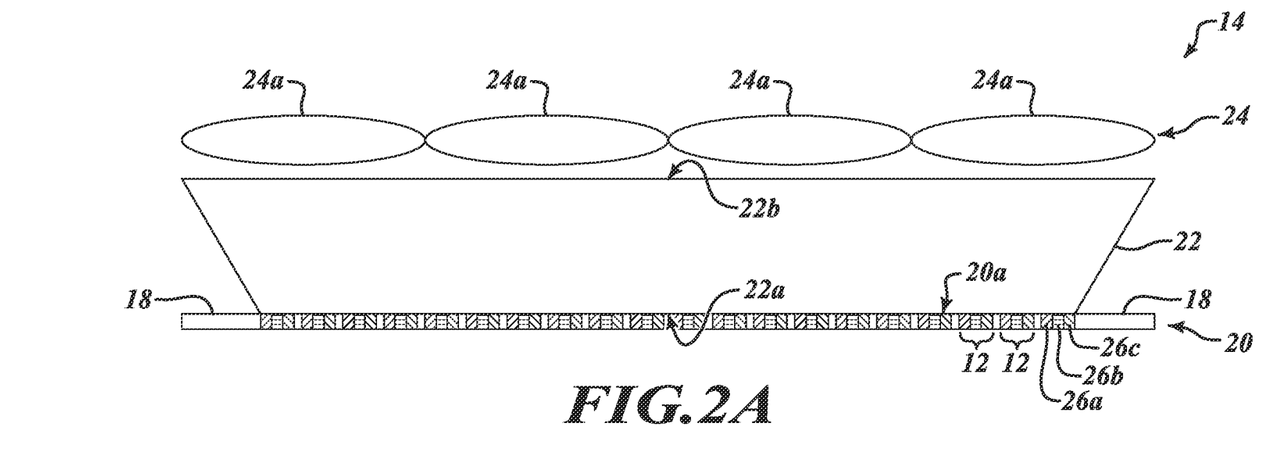
FIG. 2A illustrates one MV display device (tile) including a flat panel display (FPD), an image expansion layer, and a front optic layer.

Referring to FIG. 2A, in an exemplary embodiment of the invention, a multi-view (MV) display device (tile) 14 comprises a flat panel display (FPD) 20, an image expansion layer 22, and a front optic layer 24. The FPD 20 has a front emission surface 20a and contains a plurality of FPD pixels 12 arranged in a two-dimensional array, such as in a grid. The FPD 20 can be one of many technologies including, but not limited to, LCD, OLED, micro-LED, quantum dot, and rear projection. The FPD 20 includes an interior image area where the plurality of FPD pixels 12 are arranged, wherein each FPD pixel 12 comprises a plurality of sub-pixels 26a, 26b, 26c, and a surrounding border (perimeter) of non-image area 18 that forms a bezel. The perimeter non-image area 18 is often occupied by electrical and/or mechanical components.

The image expansion layer 22 has two surfaces—one smaller bottom surface 22a and a larger top surface 22b. The bottom surface 22a is coupled to the front emission surface 20a of the FPD 20 and covers the interior imaging area of the FPD 20 comprising the plurality of FPD pixels 12. The image on the interior imaging area of the FPD 20 is coupled from the bottom surface 22a of the image expansion layer 22 to the top surface 22b, where the size of the top surface 22b is equal to or larger than the overall profile of the FPD 20 including the perimeter non-image area 18. In the illustrated example of FIG. 2A the profile (the plan-view size) of the top surface 22b is substantially equal to the profile of the perimeter non-image area 18 of the FPD 20. The plurality of FPD pixels 12 of the interior imaging area of the FPD 20 are imaged from the bottom surface 22a to the top surface 22b of the image expansion layer 22 such that the image formed on the top surface 22b runs to the edge of the top surface 22b of the image expansion layer 22 and the image appears bezel-less. The image expansion layer 22 may be formed of a tapered fiber optic bundle, for example. The image that is formed on the top surface 22b is an expanded version of the image on the interior image area of the FPD 20 coupled to the bottom surface 22a of the image expansion layer 22. It can be advantageous for this image expansion to be largely free of distortion.

Figure 2B:
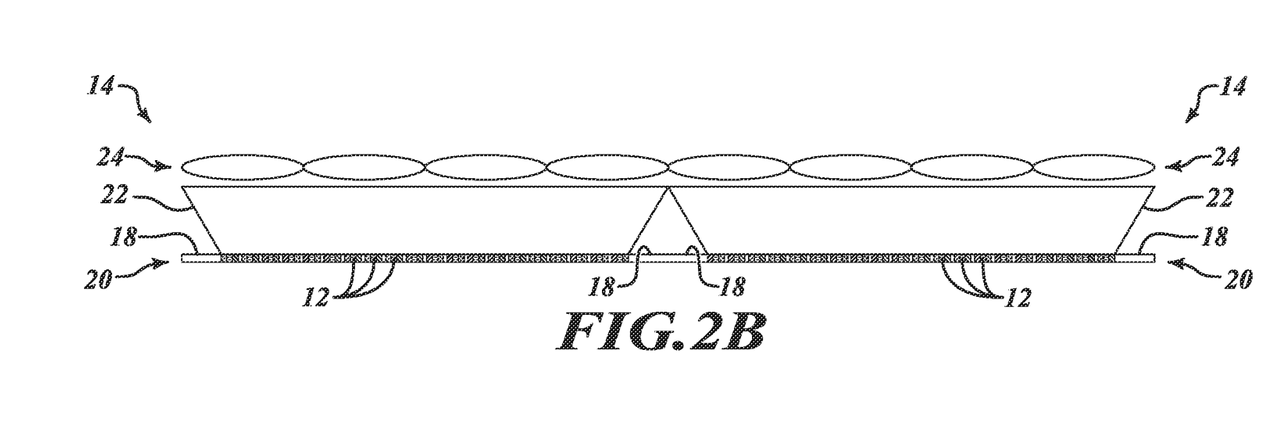
FIG. 2B illustrates two such tiles (MV display devices) adjacent to each other and exhibiting no bezels.

FIG. 2B illustrates an example in which two MV display tiles 14 as constructed above are arranged adjacent to each other and exhibiting no bezels. Unlike the tiled MV display 10 of FIG. 1B where the bezels 18 of the display tiles 14' contribute to a visually disruptive "screen-door" effect, the tiled display of FIG. 2B including two MV display tiles 14 forms images on the top surfaces of the image expansion layers 22 which appear bezel-less or with reduced bezels.

Figure 3:
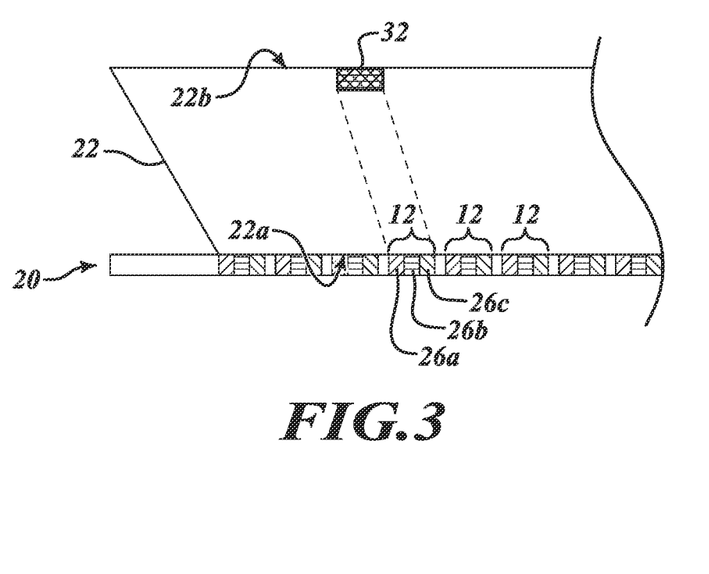
FIG. 3 illustrates an image expansion layer mixing the sub-pixels of an FPD pixel between the bottom surface and the top surface.
Figure 7:
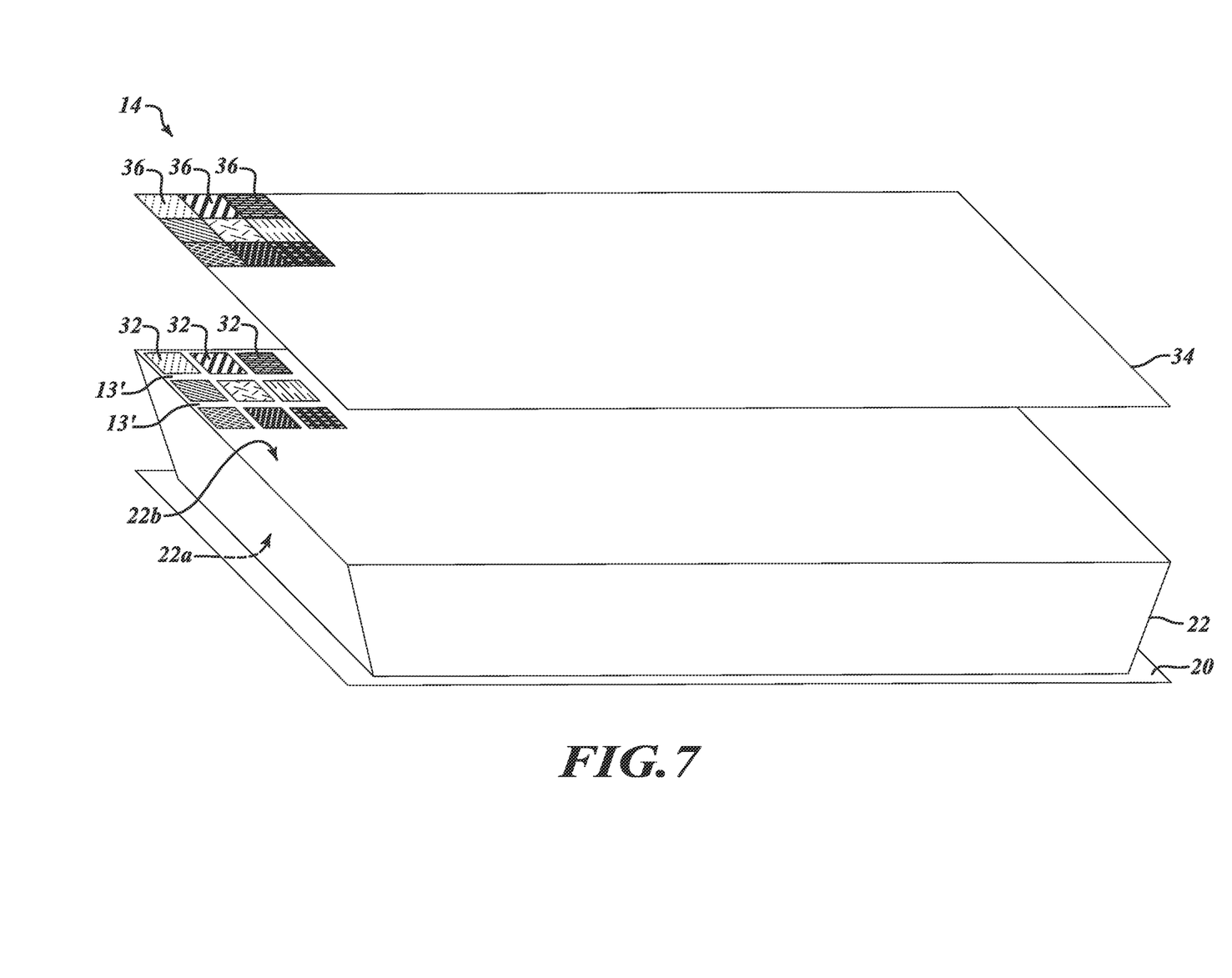
FIG. 7 illustrates a flat panel display (FPD), an image expansion layer, and a diffuser, showing the diffuser bridging inactive gaps between image pixels of the image expansion layer.

The front optic layer 24 may comprise a grid of lenses 24a, with each lens 24a covering an area of the top surface 22b of the image expansion layer 22 containing a plurality of image pixels 32 (see FIGS. 3 and 7). Light from each of the top surface image pixels 32 is collected by a lens 24a to form a light ray, or beamlet, that is emitted from the lens 24a in a defined direction. The front optic layer 24 may also comprise diffractive optics, optical waveguides, and/or optical films.

In many common flat panel displays (FPDs), each FPD pixel 12 comprises multiple sub-pixels. For example, as shown in the illustrated example of FIG. 2A, a typical LCD pixel 12 comprises a red, green, and blue sub-pixel 26a, 26b and 26c. These sub-pixels 26a-26c, when viewed from a distance, can be too small for the human eye to resolve, resulting in the eye perceiving the FPD pixel 12 to be a single color of the mixture of the three sub-pixels 26a-26c. However, in the case of a prior-art MV display where FPD pixels are magnified by front optic lenses, this sub-pixel color separation can be noticeable to the human eye, causing a disruptive visual effect.

Referring to FIG. 3, in an exemplary embodiment of the invention, the image expansion layer 22 can mix the sub-pixels 26a-26c of each FPD pixel 12 when coupling the image of the interior image area of the FPD 20 from the bottom surface 22a to the top surface 22b where the image pixel 32 is formed. It can be advantageous for this sub-pixel mixing to occur on a per-FPD-pixel basis such that little to no mixing occurs between FPD pixels 12. To that end, an example technique uses tapered fiber optic bundles with one optical fiber per FPD pixel 12 to form the image expansion layer 22. The sub-pixels 26a-26c of a FPD pixel 12 are mixed when internally reflected through the optical fiber, and the resulting color of the image pixel 32 on the top surface 22b of the image expansion layer 22 is the mixture of the sub-pixels 26a-26c.

In typical display panels, mechanical components for fastening or holding components together are housed in the bezels of the display panel. To minimize or eliminate the bezels in an MV display, another technique for fastening together display components would be desirable.

In one embodiment of the invention, the image expansion layer 22 may be secured to the FPD 20 using optical adhesive or optical bonding. These techniques allow the attachment of the image expansion layer 22 to the FPD 20 without disrupting the light emitted by the FPD pixels 12, and without introducing a bezel (perimeter) around the image expansion layer 22.

Figure 4:
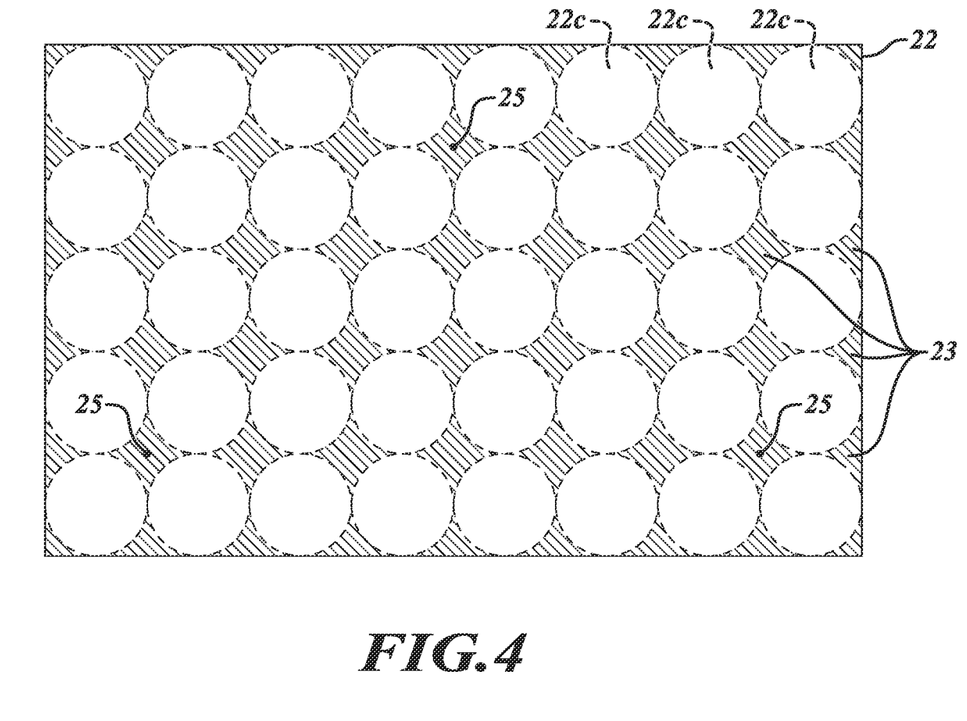
FIG. 4 illustrates a top-surface plan view of an image expansion layer including imaging areas shown in white (circles) and non-imaging areas shown in gray (hatched).

Referring to FIG. 4, in another embodiment of the invention, the surfaces of the image expansion layer 22 may include imaging areas 22c dedicated to imaging the FPD pixels 12 and non-imaging areas 23 not dedicated to imaging the FPD pixels 12. These non-imaging areas 23 can then be used for mechanical attachments. In FIG. 4, three fastening points (attachment points) 25 are arranged within the non-imaging areas 23 of the image expansion layer 22 so as not to require a bezel for the purpose of mechanical attachments. Having the non-imaging areas 23 in the image expansion layer 22 may also increase the manufacturing yield of the image expansion layer 22, as mechanical defects within the non-imaging areas 23 may be non-critical.

Figure 5:
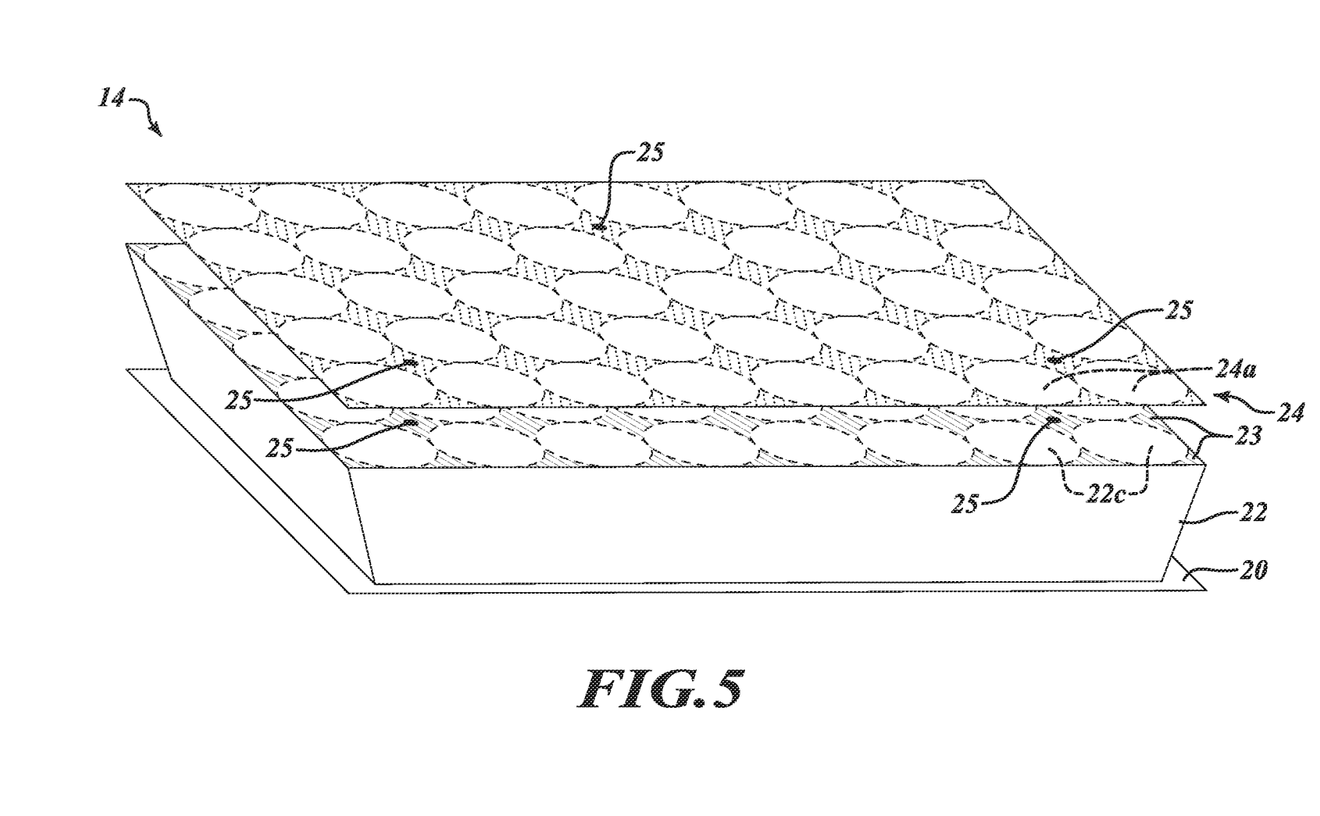
FIG. 5 illustrates an MV display device (tile) comprising an image expansion layer and a front optic layer with mechanical fastening points in aligned non-imaging areas.

Referring to FIG. 5, in a further aspect of the invention, the front optic layer 24 can be designed to optimize imaging only in the imaging areas 22c of the top surface 22b of the image expansion layer 22. For example, if front optic lenses 24a are circular and designed to correspond with circular underlying imaging areas 22c, the corners of each lens grid cell can contain mechanical attachment (fastening) points 25 to fasten to the underlying image expansion layer 22. In the example of FIG. 5, the non-imaging areas 23 of the top surface of the image expansion layer 22 are aligned with non-imaging areas of the front optic layer 24, and three fastening points 25 are arranged in the corners of the lens grid cells which form the non-imaging areas of the front optic layer 24. Then, the front optic layer 24 may be fastened to the image expansion layer 22 at these fastening points 25.

Figure 6:
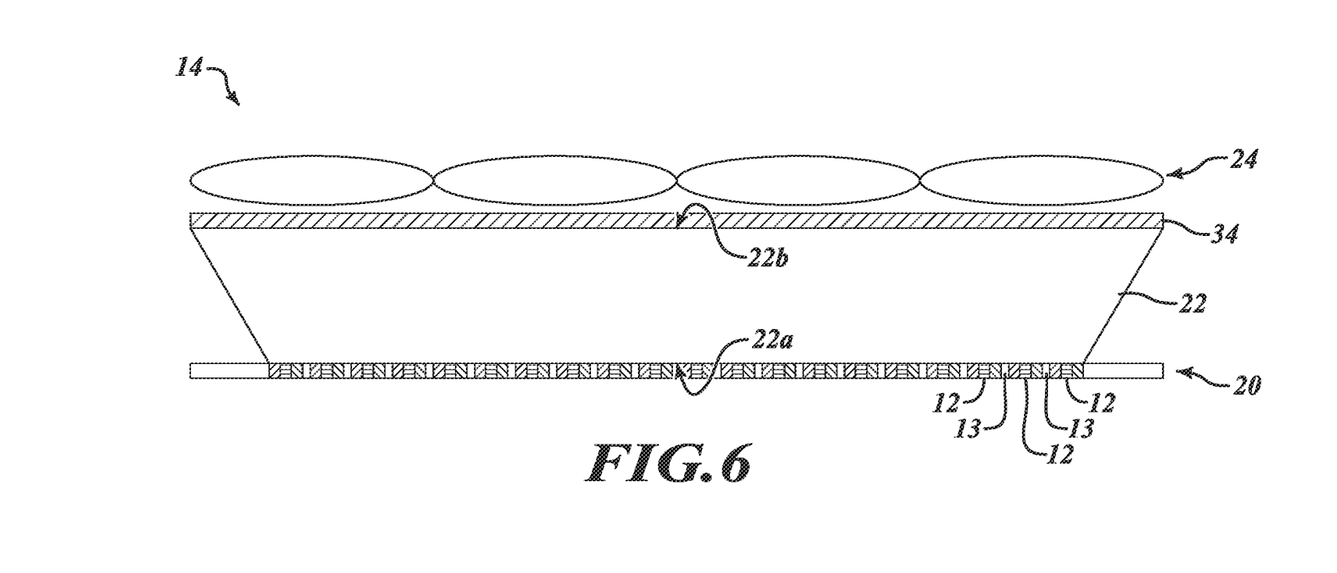
FIG. 6 illustrates an MV display device (tile) with a flat panel display (FPD), an image expansion layer, a diffuser, and a front optic layer.

Referring to FIG. 6, in typical flat panel displays (FPD) 20, there are gaps of inactive areas 13 between FPD pixels 12. Referring additionally to FIG. 7, when the FPD image is coupled through the image expansion layer 22, these inactive areas (gaps) 13 may still be visible as gaps 13' between the image pixels 32 on the top surface 22b of the image expansion layer 22. Referring back to FIG. 6, in one embodiment of the invention, a diffuser 34 may be placed between the image expansion layer 22 and the front optic layer 24. The image of the FPD pixels 12 formed in the image pixels 32 on the top surface 22b of the image expansion layer 22 may be spread across the inactive area gaps 13' by the diffuser 34, as shown in FIG. 7, such that no gaps exist between diffuser pixels 36 of a top surface of the diffuser 34.

Flat panel displays (FPD) are often designed for maximal field-of-view. However, wide fields-of-view may be inefficient or detrimental to the functionality of the image expansion layer 22. For example, a tapered fiber optic bundle used to construct the image expansion layer 22 may function better with a more collimated FPD backlight 38 or an FPD 20 with a narrow field-of-view.

Figure 8:
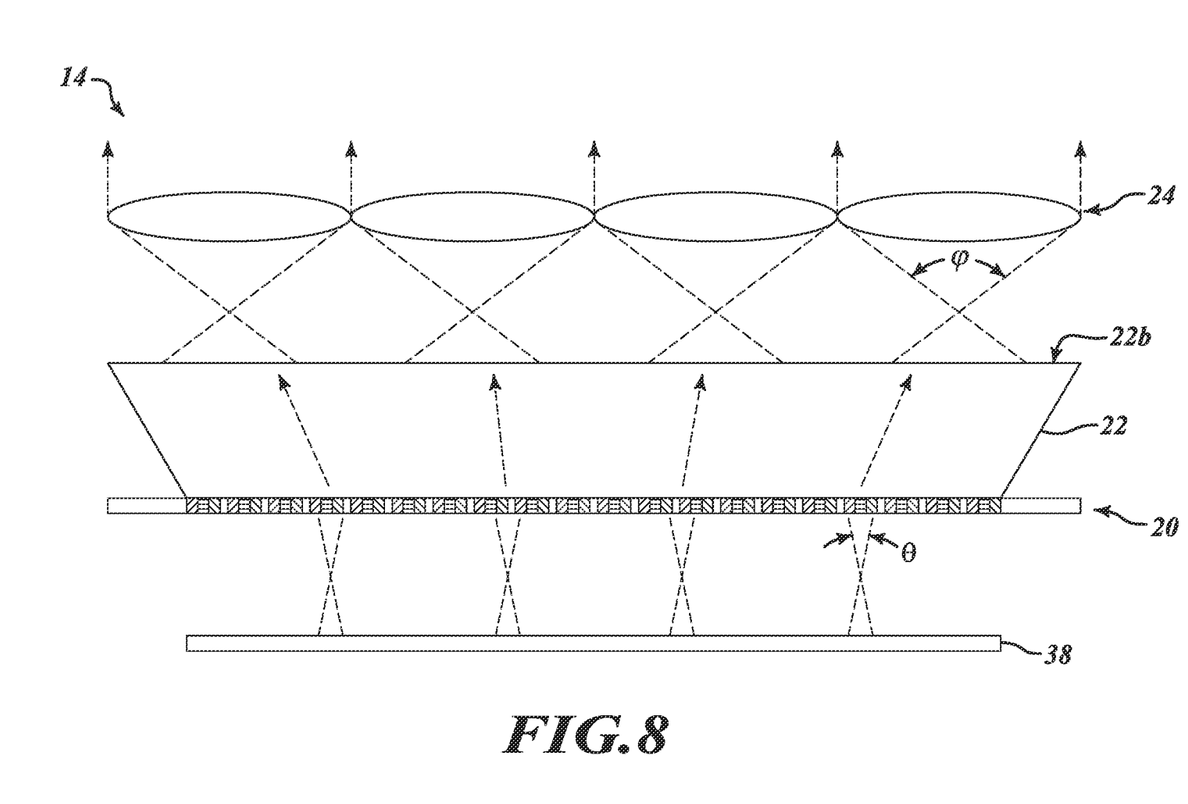
FIG. 8 illustrates an MV display device (tile) where the output angle of a backlight corresponds with the input angle of the image expansion layer, and the output angle of the image expansion layer corresponds with the input angle of the front optic layer.

Referring to FIG. 8, in one embodiment of the invention, a backlight 38 emits light with an output (convergence) angle θ that corresponds to an input collection angle of the image expansion layer 22. This could improve the optical efficiency of the MV display device (tile) 14 such that light from the backlight 38 is directed largely where it is needed. This could also improve stray light effects by reducing light at non-desirable angles. The backlight 38 may comprise, for example, an array of light-emitting diodes and optical waveguides and/or lenses.

Similarly, in one embodiment of the invention, the angle φ of the light emitted from the top surface 22b of the image expansion layer 22 is made to correspond with the input collection angle of the front optic layer 24. This could also improve both optical efficiency and stray light effects of the MV display device (tile) 14.

Figure 9:
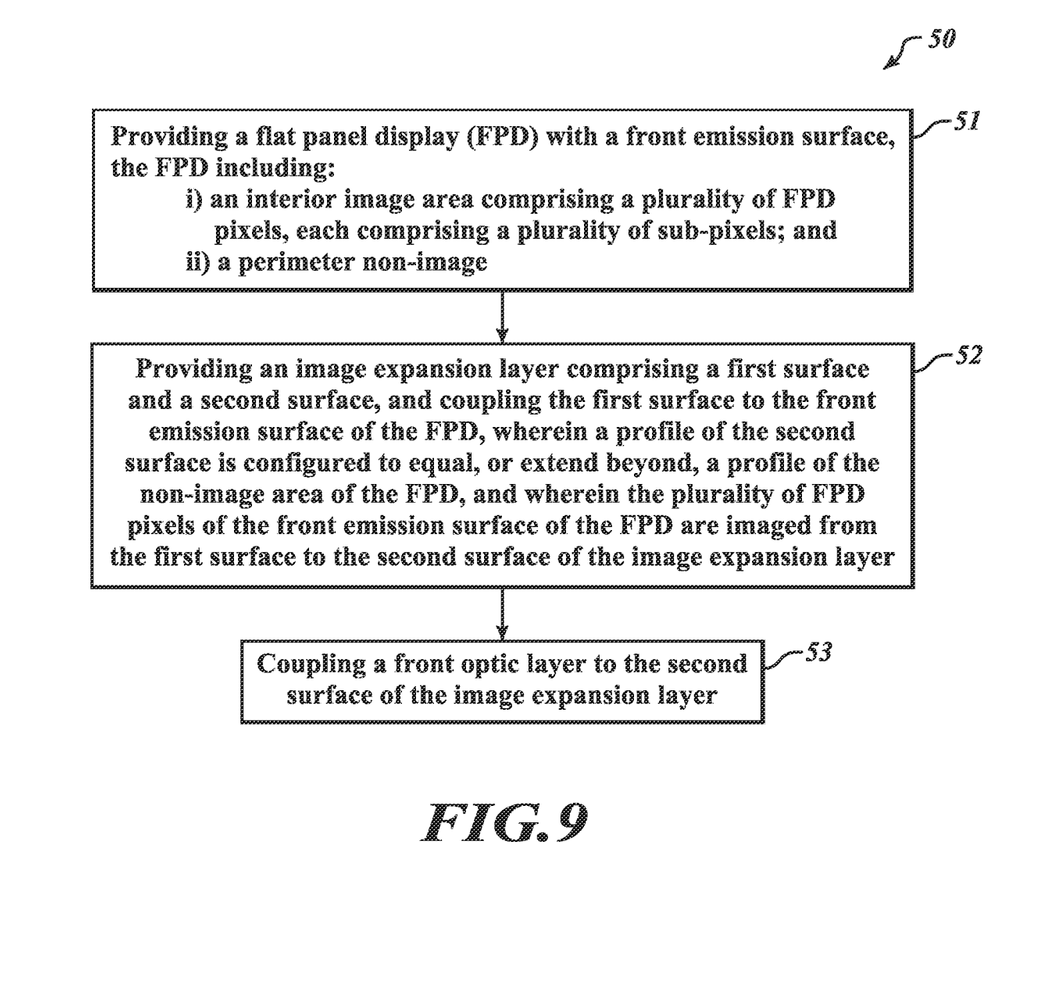
FIG. 9 is a flow chart illustrating a method of constructing an MV display device (tile).

FIG. 9 is a flow chart illustrating a sample method of forming an MV display device (tile) 14 according to an exemplary embodiment. The method 50 includes generally three steps. Step 51 includes providing a flat panel display (FPD) 20 with a front emission surface 20a, wherein the FPD 20 includes: i) an interior image area comprising a plurality of FPD pixels 12, each comprising a plurality of sub-pixels 26; and ii) a perimeter non-image area 18.

Step 52 includes providing an image expansion layer 22 comprising a first surface 22a and a second surface 22b, and coupling the first surface 22a to the front emission surface of the FPD 20, wherein a profile of the second surface 22b is configured to equal, or extend beyond, a profile of the perimeter non-image area 18 of the FPD 20, and wherein the plurality of FPD pixels 12 of the front emission surface of the FPD 20 are imaged from the first surface 22a to the second surface 22b of the image expansion layer 22. For example, the first surface 22a of the image expansion layer 22 may be optically adhered or bonded to the FPD 20. As another example, the second surface 22b of the image expansion layer 22 may include an imaging area 22c and a non-imaging area 23 and include a fastening point 25 in the non-imaging area 23. The non-imaging area 23 of the image expansion layer 22 may be aligned with a non-imaging area of the front optic layer 24, and the front optic layer 24 may be fastened to the image expansion layer 22 at the fastening point 25.

Step 53 includes coupling a front optic layer 24 to the second surface 22b of the image expansion layer 22.

Optionally, a convergence angle of an output of the second surface 22b of the image expansion layer 22 may be made to correspond to the input collection angle of the front optic layer 24. Further optionally, a diffuser 34 may be provided between the image expansion layer 22 and the front optic layer 24.

When providing a backlight 38 for the FPD 20, a convergence angle of the backlight 38 may be made to correspond to the input collection angle of the first surface 22a of the image expansion layer 22.

It will be appreciated that the principles disclosed and claimed herein may be readily and desirably combined with various features disclosed in the incorporated references. The various implementations described above can be combined to provide further implementations. These and other changes can be made to the implementations in light of the above-detailed description. In general, in the following claims, the terms used should not be construed to limit the claims to the specific implementations disclosed in the specification, but should be construed to include all possible implementations along with the full scope of equivalents to which such claims are entitled.

What is claimed is:

1. A multi-view (MV) display device, comprising:
  i) a flat panel display (FPD) with a front emission surface and including:
    an interior image area comprising a plurality of FPD pixels, each comprising a plurality of sub-pixels; and
    a perimeter non-image area which surrounds the interior image area;
  ii) an image expansion layer comprising a first planar surface and a second planar surface, wherein
    the first planar surface has a first profile in a plan view and is coupled to the front emission surface of the FPD;
    the second planar surface has a second profile in a plan view, wherein the second profile is greater than the first profile and is equal to or extends beyond a profile of the perimeter non-image area of the FPD; and
    the plurality of FPD pixels of the front emission surface of the FPD are imaged from the first planar surface to the second planar surface of the image expansion layer; and
  iii) a front optic layer coupled to the second planar surface of the image expansion layer.

2. The MV display device of claim 1, wherein the front optic layer comprises a lens, diffractive optic, optical waveguide, or optical film.

3. The MV display device of claim 1, wherein the image expansion layer comprises a tapered fiber optic bundle.

4. The MV display device of claim 1, wherein the first planar surface of the image expansion layer is optically adhered or bonded to the FPD.

5. The MV display device of claim 1, wherein a color of the image of a FPD pixel on the second planar surface of the image expansion layer is a mixture of colors of the plurality of sub-pixels of the FPD pixel.

6. The MV display device of claim 1, wherein the second planar surface of the image expansion layer comprises an imaging area and a non-imaging area.

7. The MV display device of claim 6, wherein the non-imaging area of the second planar surface of the image expansion layer is aligned with a non-imaging area of the front optic layer.

8. The MV display device of claim 7, wherein the image expansion layer includes a fastening point on the second planar surface in the non-imaging area.

9. The MV display device of claim 8, wherein the front optic layer is fastened to the image expansion layer at the fastening point.

10. The MV display device of claim 1, further comprising a diffuser between the image expansion layer and the front optic layer, the diffuser comprising a first surface coupled to the second planar surface of the image expansion layer and a second surface coupled to the front optic layer.

11. The MV display device of claim 10, wherein the image of a FPD pixel on the second surface of the diffuser is diffused across an inactive area surrounding the image of the FPD pixel on the second planar surface of the image expansion layer.

12. The MV display device of claim 1, further comprising a backlight wherein a convergence angle of the backlight corresponds to a collection angle of the first planar surface of the image expansion layer.

13. The MV display device of claim 12, wherein the backlight comprises:
   a plurality of light-emitting devices; and
   an optical waveguide or a plurality of lenses.

14. The MV display of claim 1, wherein a convergence angle of an output of the second planar surface of the image expansion layer corresponds to a collection angle of the front optic layer.

15. The MV display of claim 1, further comprising:
   (iv) a second FPD with a front emission surface and including:
      an interior image area comprising a plurality of FPD pixels, each comprising a plurality of sub-pixels; and
      a perimeter non-imaging area which surrounds the interior image area;
   (v) a second image expansion layer comprising a third planar surface and a fourth planar surface, wherein
      the third planar surface has a third profile in a plan view and is coupled to the front emission surface of the second FPD;
      the fourth planar surface has a fourth profile in a plan view, wherein the fourth profile is greater than the third profile and is equal to or extends beyond a profile of the perimeter non-image area of the second FPD; and
      the plurality of FPD pixels of the front emission surface of the second FPD are imaged from the third planar surface to the fourth planar surface of the second image expansion layer; and
   vi) a second front optic layer coupled to the fourth planar surface of the second image expansion layer.

16. The MV display of claim 15, wherein the front optic layer of the FPD and the second front optic layer of the second FPD are arranged adjacent to each other to form a unitary MV display.

17. A method of forming a multi-view (MV) display device, comprising:
   providing a flat panel display (FPD) with a front emission surface, the FPD including: i) an interior image area comprising a plurality of FPD pixels, each comprising a plurality of sub-pixels; and ii) a perimeter non-image area which surrounds the interior image area;
   providing an image expansion layer comprising a first planar surface and a second planar surface, and coupling the first planar surface to the front emission surface of the FPD, wherein the first planar surface has a first profile in a plan view and the second planar surface has a second profile in a plan view, wherein the second profile is greater than the first profile and is equal to or extends beyond a profile of the perimeter non-image area of the FPD, and wherein the plurality of FPD pixels of the front emission surface of the FPD are imaged from the first planar surface to the second planar surface of the image expansion layer; and
   coupling a front optic layer to the second planar surface of the image expansion layer.

18. The method of claim 17, comprising:
   optically adhering or bonding the first planar surface of the image expansion layer to the FPD.

19. The method of claim 17, wherein the second planar surface of the image expansion layer comprises an imaging area and a non-imaging area and includes a fastening point in the non-imaging area, and the method comprises:
   aligning the non-imaging area of the image expansion layer with a non-imaging area of the front optic layer; and
   fastening the front optic layer to the image expansion layer at the fastening point.

20. The method of claim 17, comprising:
   providing a diffuser between the image expansion layer and the front optic layer.

* * * * *